US007963761B2

(12) United States Patent  
Oh et al.

(10) Patent No.: US 7,963,761 B2  
(45) Date of Patent: Jun. 21, 2011

(54) INJECTION MOLDING APPARATUS FOR HIGH-GLOSS PRODUCTS

(76) Inventors: Yeong-Jong Oh, Gwangju (KR); Hyung-Jong Oh, Gwangju (KR)

(*) Notice: Subject to any disclaimer, the term of this patent is extended or adjusted under 35 U.S.C. 154(b) by 0 days.

(21) Appl. No.: 12/564,871

(22) Filed: Sep. 22, 2009

(65) Prior Publication Data

US 2011/0059201 A1 Mar. 10, 2011

(30) Foreign Application Priority Data

Sep. 7, 2009 (KR) .................. 10-2009-0084108

(51) Int. Cl.
*B29C 45/73* (2006.01)
(52) U.S. Cl. ........................... 425/547; 425/552
(58) Field of Classification Search .............. 425/547, 425/552
See application file for complete search history.

(56) References Cited

U.S. PATENT DOCUMENTS

| 5,423,670 A * | 6/1995 | Hamel ........................... 425/552 |
| 7,323,127 B2 * | 1/2008 | Muranaka et al. ............ 425/547 |
| 7,484,953 B2 * | 2/2009 | Yoshino et al. ............... 425/552 |
| 7,540,989 B2 * | 6/2009 | Kang ............................ 425/548 |

* cited by examiner

*Primary Examiner* — Tim Heitbrink
(74) *Attorney, Agent, or Firm* — Mitchell P. Brook; Luce, Foward, Hamilton & Scripps LLP

(57) ABSTRACT

An injection molding apparatus includes a first mold supported on a first fixed plate, a second mold assembled to and disassembled from the first mold and forming a cavity for injection molding, a third mold installed so as to be assembled to and disassembled from the second mold, a guide portion guiding the assembly and disassembly of the first, second, and third molds, and a heating and cooling portion heating the second molding when injecting resin for forming a product into the cavity formed as the first and second molds are assembled to each other and cooling the second mod when curing the resin injected into the cavity.

1 Claim, 8 Drawing Sheets

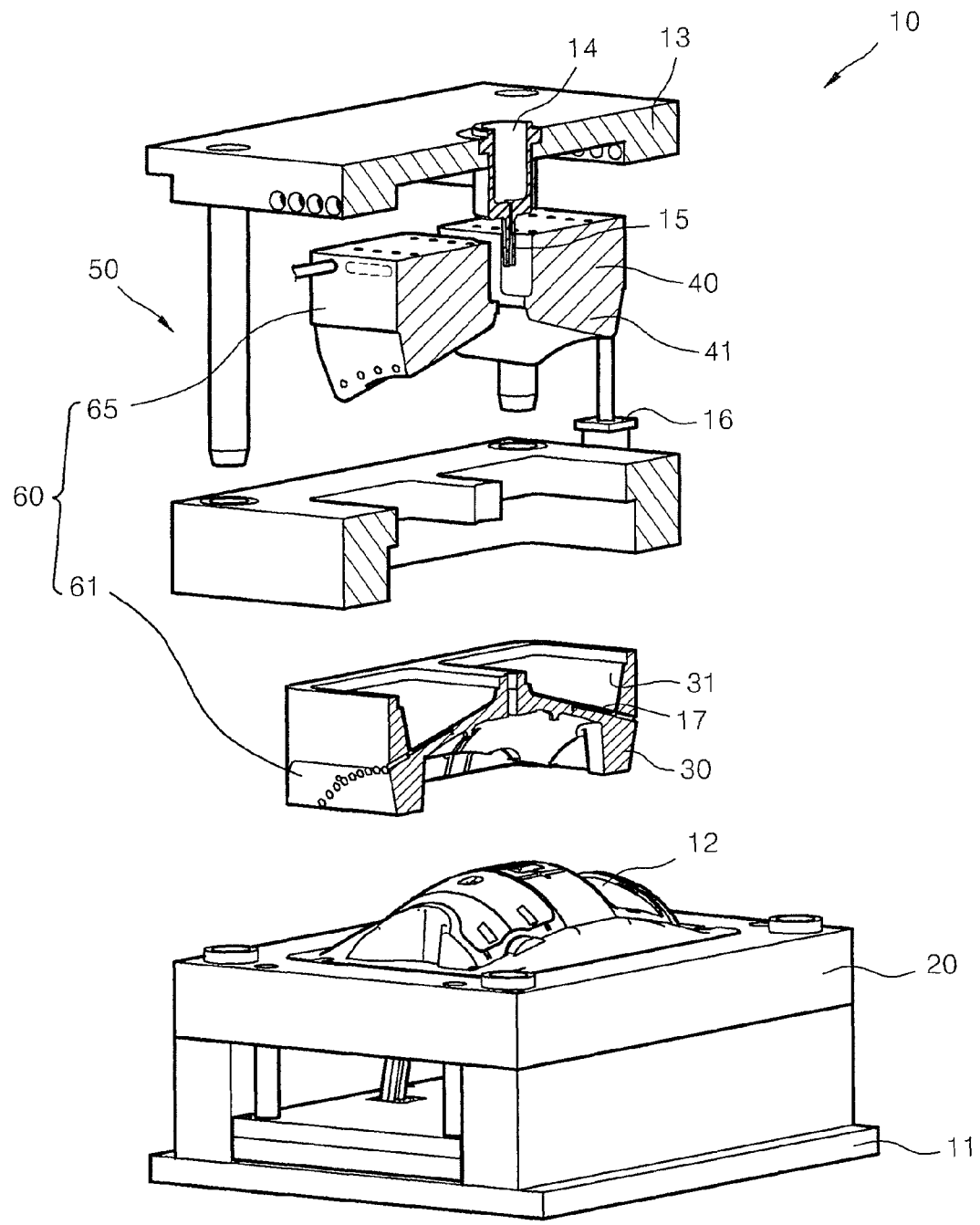
[Fig 1]

[Fig 2]
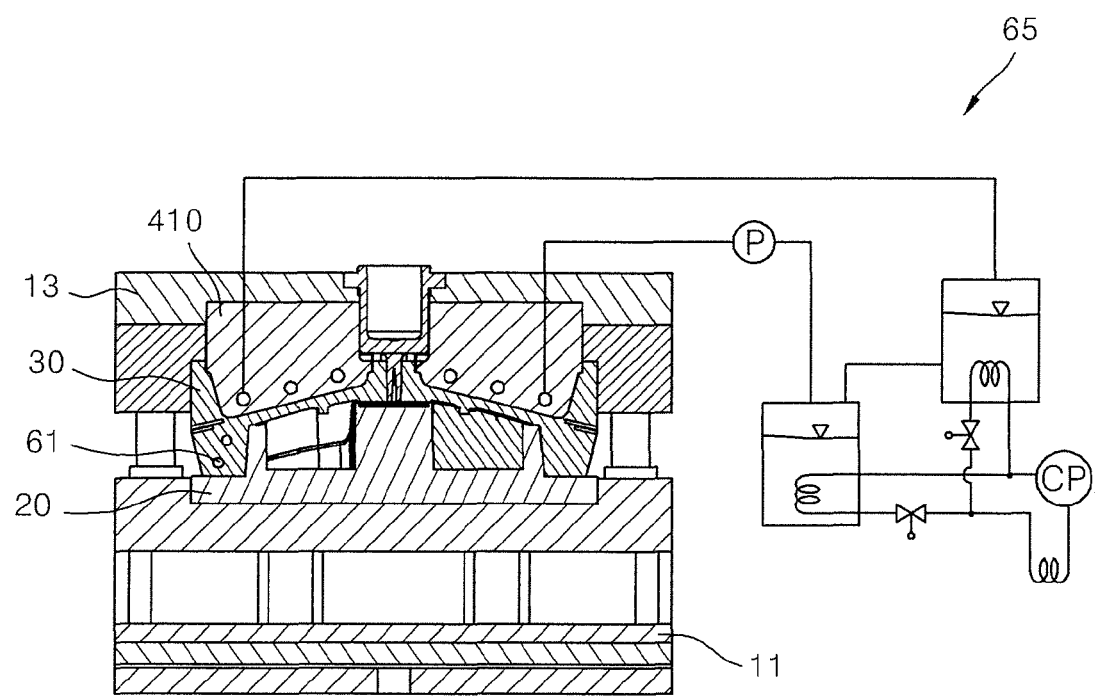

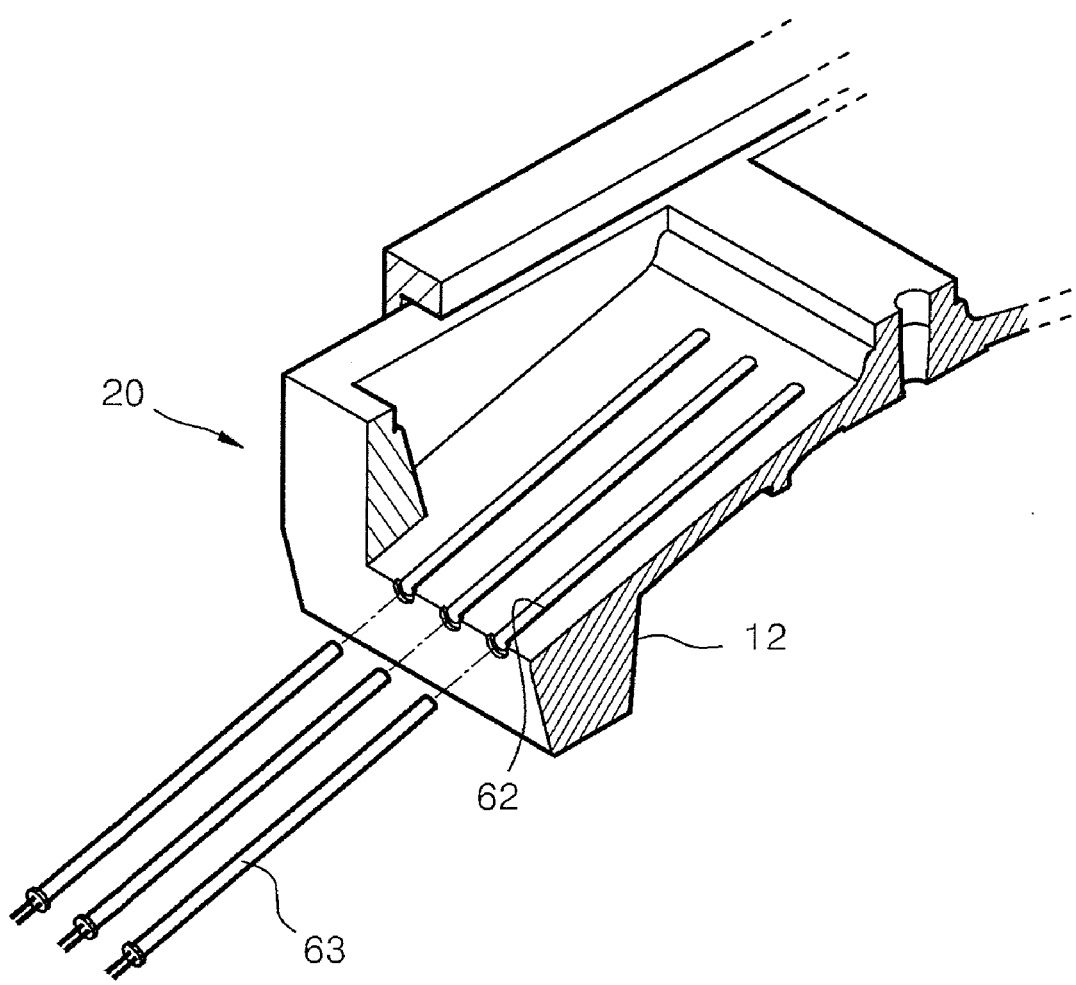
[Fig 3]

[Fig 4]
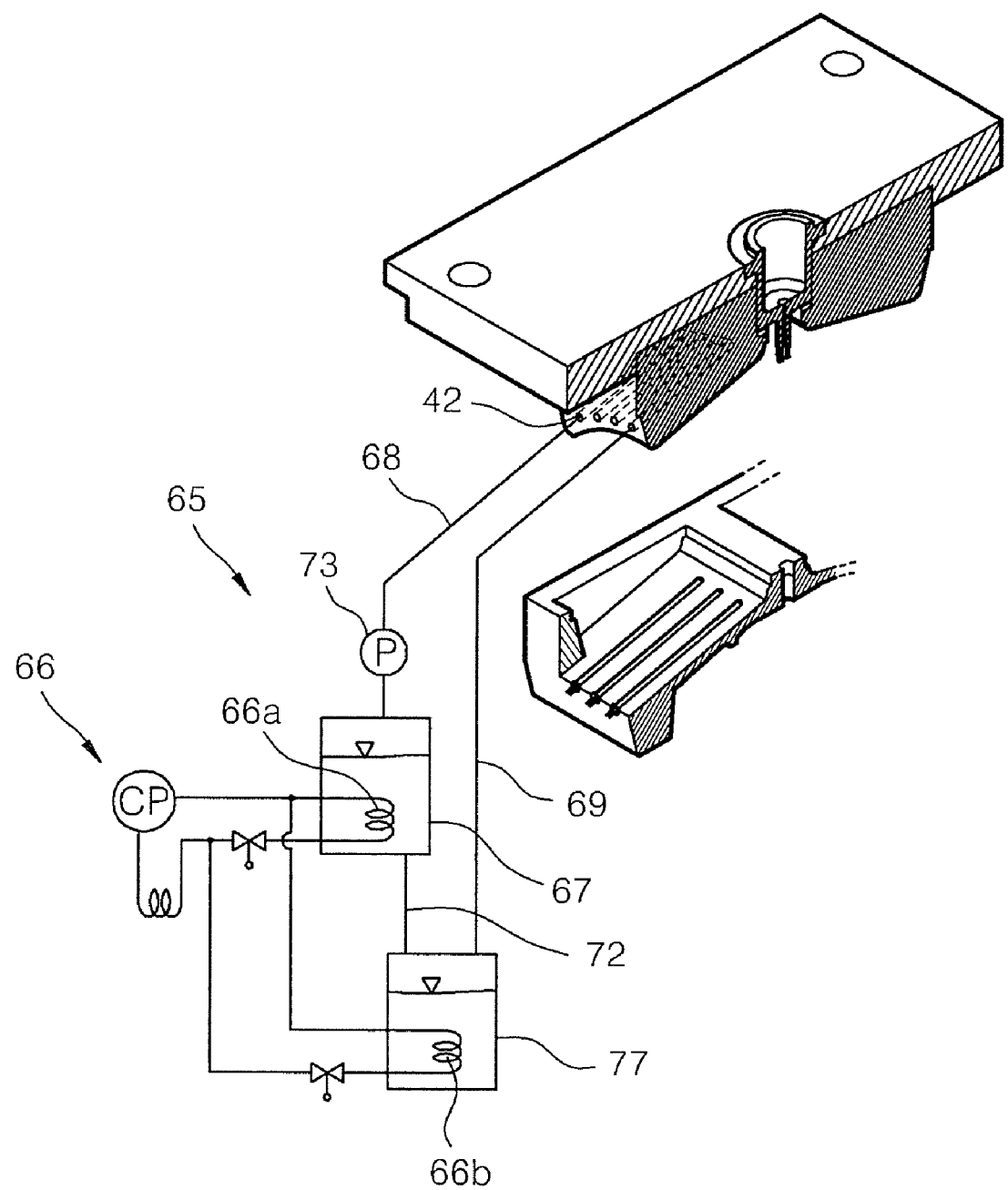

[Fig 5]
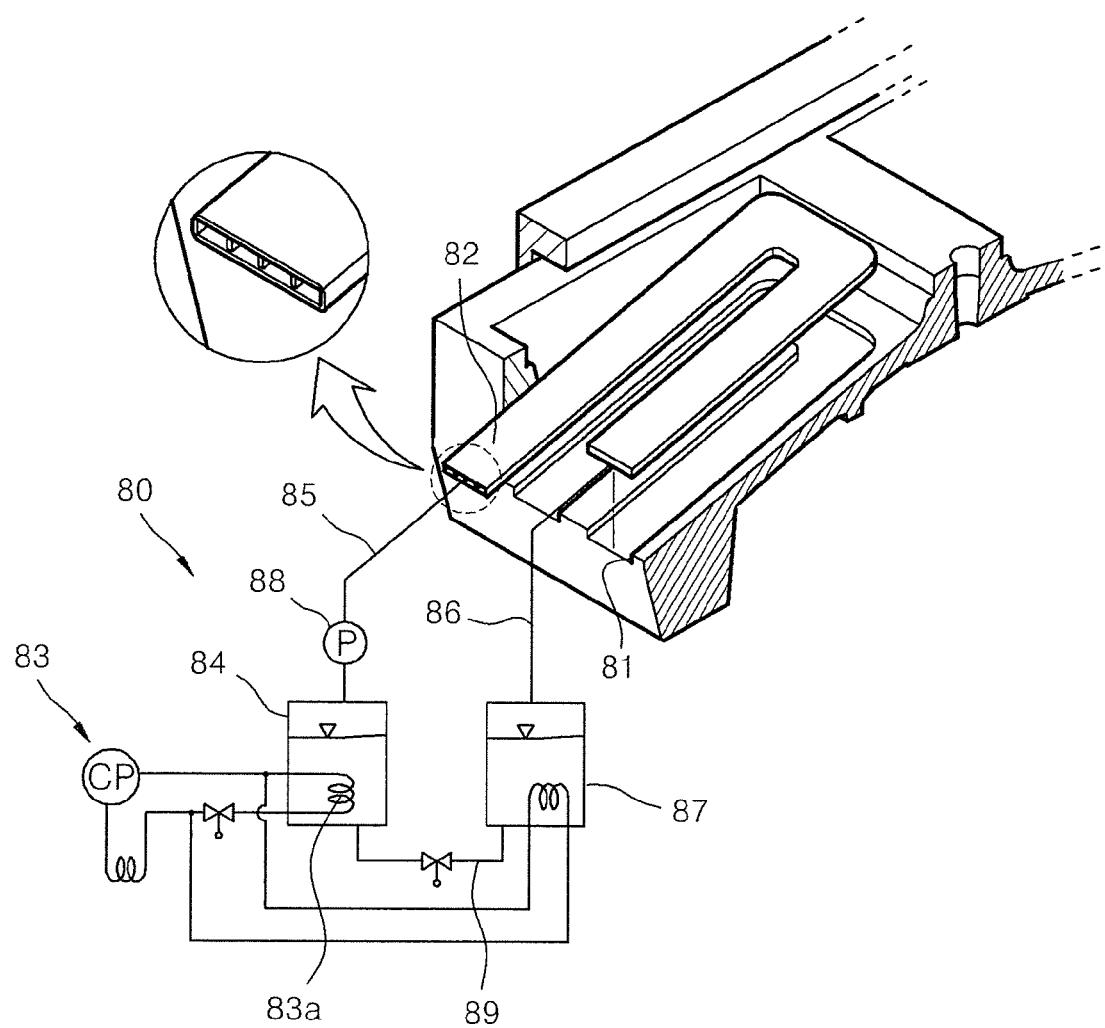

[Fig 6]
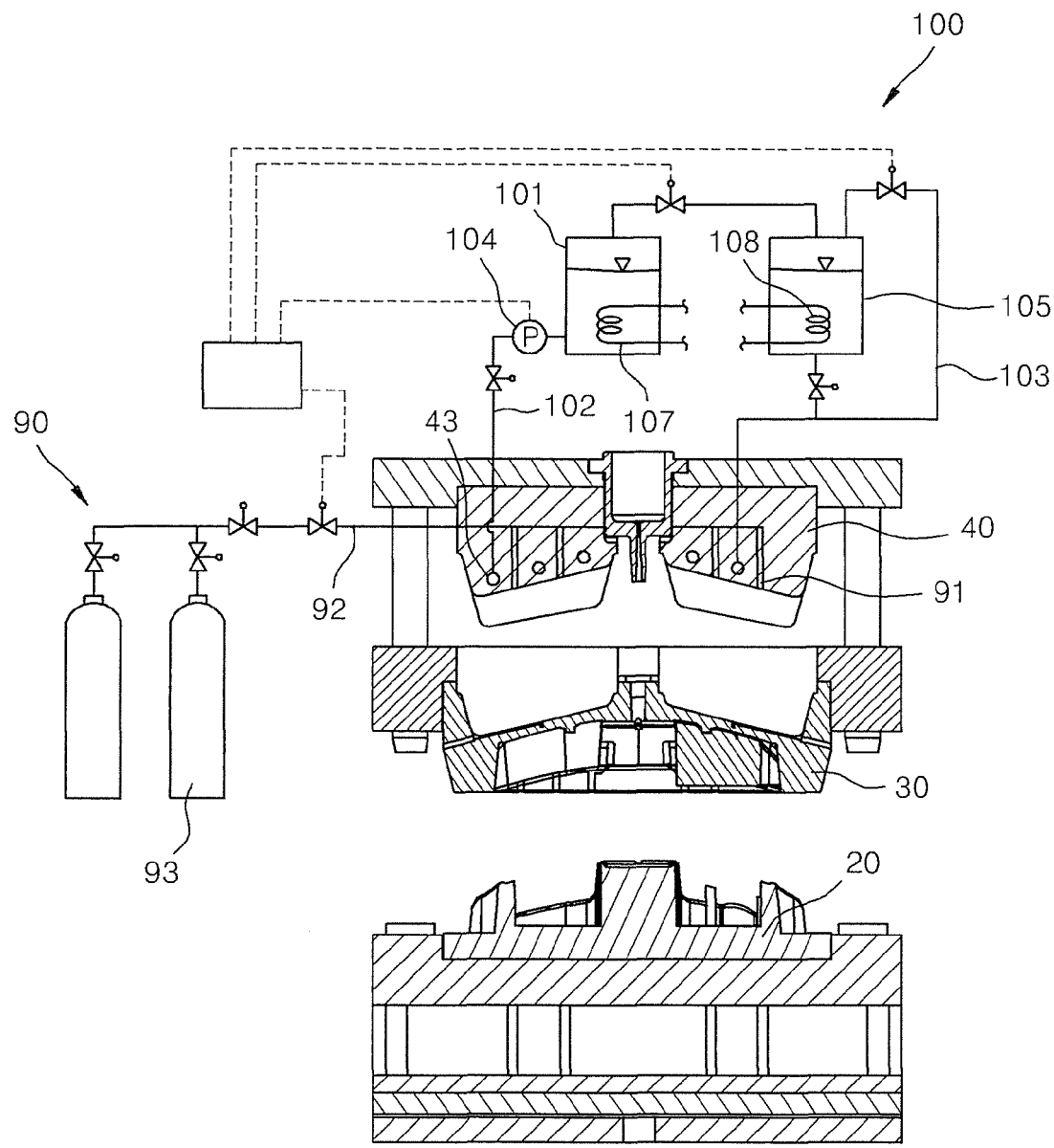

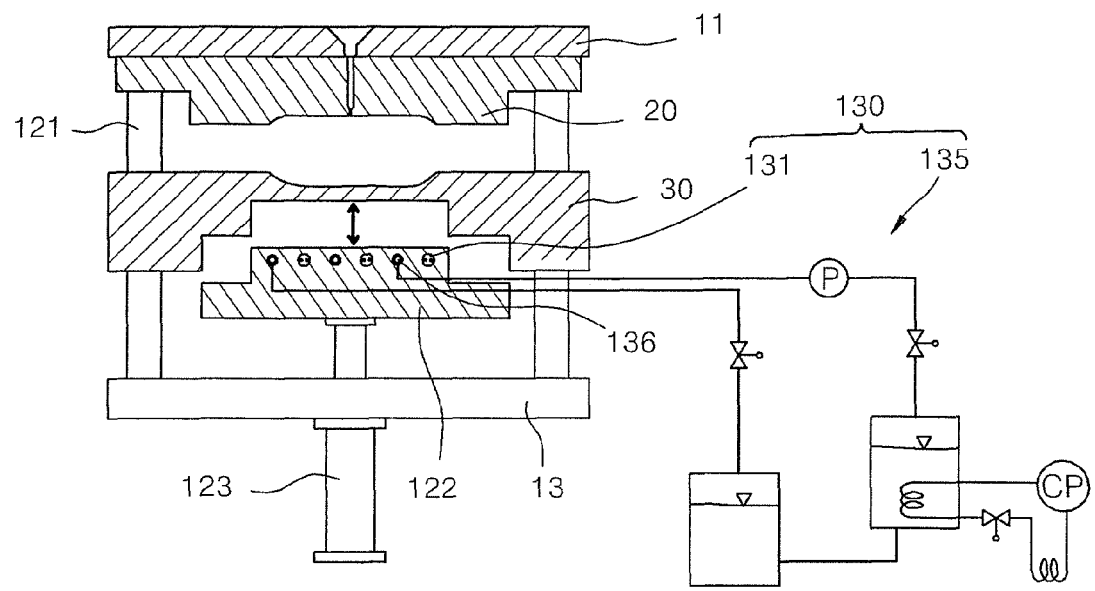
[Fig 7]

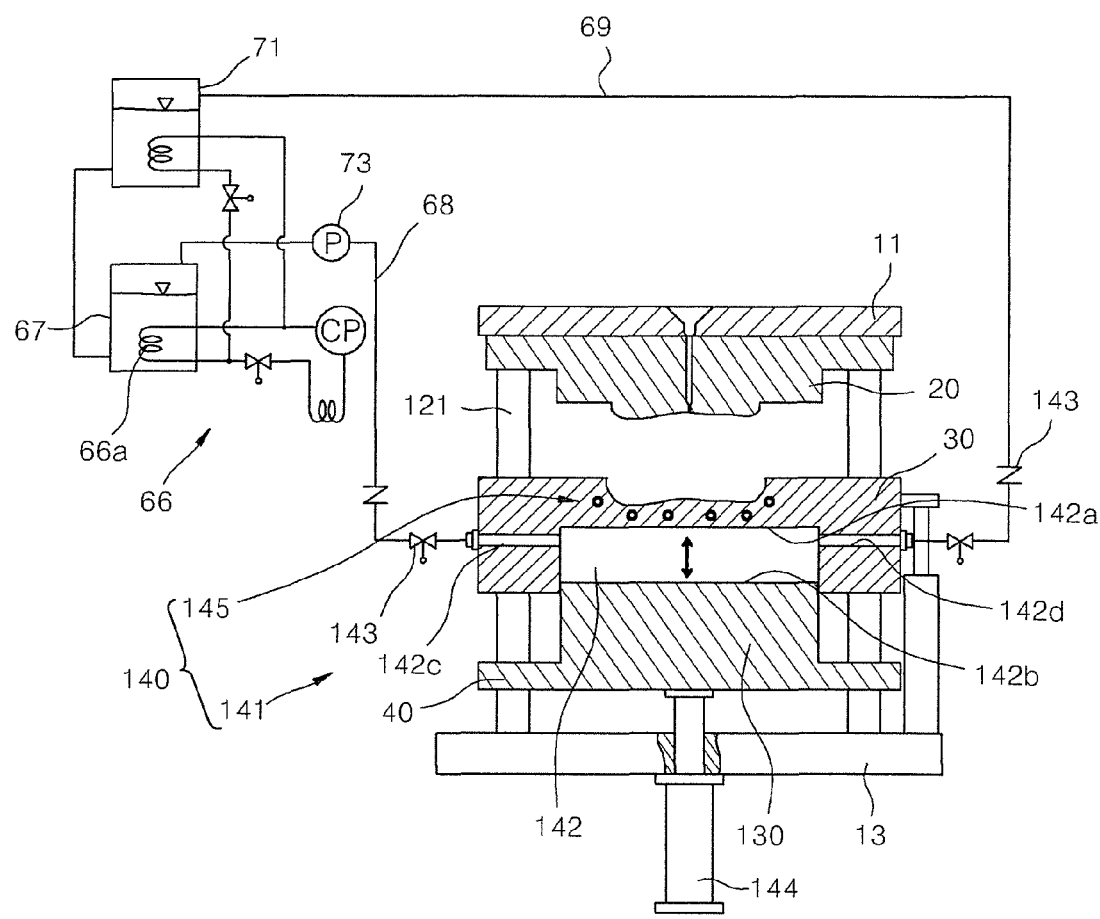
[Fig 8]

INJECTION MOLDING APPARATUS FOR HIGH-GLOSS PRODUCTS

This application claims the priority of Korean Patent Application No. 2009-0084108, filed 9, 7, 2009, in the Korean Intellectual Property Office, the disclosure of which is incorporated herein in its entirety by reference.

BACKGROUND OF THE INVENTION

1. Field of the Invention

The present invention relates to an injection molding apparatus for high-gloss products, and more particularly, to a weldless injection molding apparatus which can rapidly heating and cooling an injection mold during injection molding of a product using an injection mold.

2. Description of the Related Art

Injection molding is a process for forming products by applying heat to polymer resin to be plasticized and then injecting melted polymer resin into a mold using a hydraulic force. According to the injection molding, products of different sizes may be mass-produced.

In general, forming of the polymer resin has demerits, such as low surface glossiness and poor outer appearance due to a weld line generated as the melted polymer resin meets the inside of a mold.

To overcome the demerits, a hot pressing method has been widely used in which a temperature for injection molding is set to be higher than a melting temperature of a polymer resin. Examples of the hot pressing method are disclosed in Japanese Patent Publication No. sho 45-22020 entitled "Method of Heating Using Hot Wind", Japanese Patent Publication No. sho 51-22759 entitled "Method of Heating Using Electric Heater and Method of Cooling Using Water", Japanese Patent Publication No. sho 55-109639 entitled "Method of Heating Using High Frequency Induction", Japanese Patent Publication No. sho 57-165229 entitled "Method of Heating by Blowing Vapor into Cavity", Japanese Patent Publication No. sho 61-79614 entitled "Method of Inserting Heat Plate between Cavity and Core", and Japanese Patent Publication No. hei 4-265720 entitled "Method of Heating Surface of Mold by Electric Conductive Layer".

However, when polymer resin is formed by setting the temperature of injection molding higher than the melting temperature of the polymer resin, no weld line is generated and outer appearance, such as glossiness, may be improved. In contrast, a cooling time extends due to the high mold temperature and an overall forming cycle extends so that production efficiency may be deteriorated. Also, since the polymer resin is disassembled from the mold by being cooled down under the melting temperature, deformation due to contraction becomes severe compared to a general injection case.

The mold heating methods, which have been used at initial stages, require quite a long time to heat a mold surface because of their low heating rate. Accordingly, an overall cycle time for forming molded products may extend, resulting in poor production efficiency. To address the problem associated with low heating rate, the temperature of a mold may be set to be relatively high. In such a case, however, a cooling time may be prolonged.

Considering the above issues, a system for automatically controlling temperature of an injection mold was suggested and disclosed in Korean Patent Registration No. 811909. In addition, Korean Patent Registration No. 167711 discloses a mold cooling system; Korean Patent Registration No. 470835 discloses a mold temperature control system; and Korean Patent Registration No. 701229 discloses a structure in which rapid heating and cooling of a mold is carried out within a range between 100° C.-200° C.

With the above structures, however, the issues stated above cannot be overcome because the heating and cooling of an injection mold is not carried out within a short time. In particular, the injection structure requires a lot of cooling lines and hot water supply lines for heating and cooling so that the structure of a mold may be relatively weak and thus the mold may be deformed during a repeated number of forming cycles.

SUMMARY OF THE INVENTION

To solve the above and/or other problems, the present invention provides an injection molding apparatus for high-gloss products which can improve a structural strength of a mold and enhance heating and cooling efficiency by reducing a heat capacity of an injection mold.

The present invention provides an injection molding apparatus for high-gloss products which can reduce a cycle time in injection molding.

According to an aspect of the present invention, an injection molding apparatus for high-gloss products includes a first mold supported on a first fixed plate, a second mold assembled to and disassembled from the first mold and forming a cavity for injection molding, a third mold installed so as to be assembled to and disassembled from the second mold, a guide portion guiding the assembly and disassembly of the first, second, and third molds, and a heating and cooling portion heating the second molding when injection resin for forming a product into the cavity formed as the first and second molds are assembled to each other and cooling the second mold when curing the resin injected into the cavity.

The second mold may be formed to be thinner than the third mold so that heat capacity of the second mold is smaller than that of the third mold. The heating and cooling portion may include a heating unit installed at the second mold to heat the second mold when injecting resin into the cavity for injection molding, and a cooling unit supplying a heat exchange coolant to a cooling path formed in the second mold to rapidly cool the second mold when curing the resin injected into the cavity.

In the heating unit, a groove is formed in a lower surface of a core mold corresponding to the second mold and an electric heater is installed in the groove. The cooling unit may include a reservoir tank containing a heat transfer fluid, in which an evaporator of a cooling system to cool a heat exchanger, a supply pipe connecting the reservoir tank and a cooling path formed in the third mold, an auxiliary tank connected to an output of the cooling path via a connection pipe, a return pipe connecting the auxiliary tank and the reservoir tank, and a pump installed at the supply pipe to pump the cooled heat exchange fluid toward the cooling path. The cooling unit may include a gas tank containing liquid nitrogen or liquid carbon, a nozzle installed at the gas tank and the third mold, a gas supply pipe connecting the nozzle and the gas tank, and a valve installed on the gas supply pipe.

In the heating and cooling portion, a groove, a width of which is greater than its depth, may be formed in the second mold forming the cavity for forming and a tube to cool and heat the second mold may be installed in the groove. The injection molding apparatus may further include a heat exchange fluid supply portion that is connected to the tube and selectively supplies heated or cooled heat exchange fluid for heating and cooling.

According to another aspect of the present invention, an injection molding apparatus for high-gloss products may include a first mold supported on a first fixed plate, a second mold assembled to and disassembled from the first mold and forming a cavity for injection molding, a third mold installed so as to be assembled to and disassembled from the second mold, a guide portion guiding the assembly and disassembly of the first, second, and third molds, and a heating and cooling portion heating the second molding when injecting resin for forming a product into the cavity formed as the first and second molds are assembled to each other and cooling the second mod when curing the resin injected into the cavity. Here, the heating and cooling portion may include a heating unit including an electric heater installed at the third mold, and a cooling unit selectively supplying cooled heat exchange fluid to a cooling path formed in the third mold to cool the third mold.

According to another aspect of the present invention, an injection molding apparatus for high-gloss products may include a first mold supported on a first fixed plate, a second mold assembled to the first mold to form a cavity and having a guide portion, a third mold installed so as to move up and down with respect to the second mold and assembled to and disassembled from the second mold, and a heating and cooling portion heating or cooling the second mold during injection molding of a product using the first and second molds. Here, the heating and cooling portion may include a cooling unit and a heating unit, the cooling unit formed by the second and third molds at a side corresponding to the cavity formed by the first and second molds to absorb and exhaust a heat exchange fluid for heating and cooling, and the cooling unit comprising a pumping portion including a cylinder portion formed on a rear surface of the second mold and a piston portion installed at the third mold and coupled to the cylinder portion, and a reservoir tank connected to a supply and exhaust pipe of the cylinder portion and supplying the heat exchange fluid.

BRIEF DESCRIPTION OF THE DRAWINGS

The above aspect and advantages of the present invention will become more apparent by describing in detail preferred embodiments thereof with reference to the attached drawings in which:

FIG. 1 is a partially cut-away perspective view of an injection molding apparatus according to an embodiment of the present invention;

FIG. 2 is a cross-sectional view of the injection molding apparatus shown in FIG. 1;

FIG. 3 is a partially cut-away perspective view of a heating unit installed at a second mold of the injection molding apparatus shown in FIG. 1;

FIG. 4 is a perspective view of a cooling unit for cooling a third mold of the injection molding apparatus shown in FIG. 1;

FIG. 5 is a perspective view illustrating another embodiment of the cooling unit for cooling the second mold according to the present invention;

FIG. 6 is a cross-sectional view illustrating another embodiment of a heating and cooling portion of the injection molding apparatus according to the present invention; and FIGS. 7 and 8 are cross-sectional views illustrating still another embodiment of a heating and cooling portion of the injection molding apparatus according to the present invention.

DETAILED DESCRIPTION OF THE INVENTION

The attached drawings for illustrating preferred embodiments of the present invention are referred to in order to gain a sufficient understanding of the present invention, the merits thereof, and the objectives accomplished by the implementation of the present invention. Hereinafter, the present invention will be described in detail by explaining preferred embodiments of the invention with reference to the attached drawings. Like reference numerals in the drawings denote like elements.

An apparatus for injection molding products having high gloss 10 for heating and cooling a mold during injection molding of a product according to an embodiment of the present invention will be described with reference to FIGS. 1-4.

Referring to FIGS. 1-4, the weldless injection molding apparatus 10 includes a first mold 20 supported on a first fixed plate 11, a second mold 30 forming a cavity 12 for injection molding of a product by being assembled to the first mold 20, a third mold 40 supported on a second fixed plate 13 and assembled to or disassembled from the second mold 30 so as to transfer heat, and a guide unit 50 guiding the assembly and disassembly of the first, second, and third molds 20, 30, and 40. The weldless injection molding apparatus 10 further includes a heating and cooling portion 60 that heats the second mold 30 when resin is injected into the cavity 12 for injection molding, and cools the second mold 30 when the resin injected into the cavity 12 is cured.

In detail, a sprue bush 14 to inject resin into the cavity 12 is installed at the second fixed plate 13, the second mold 30, and the third mold 40. Alternatively, the sprue bush 14 may be installed at the first mold 20. A runner 15 is provided to connect the sprue bush 14 and the cavity 12. Molten resin is injected into the cavity 12 through the sprue bush 14 to then be pressed by injection molding.

The second mold 30 is relatively thinner than the first mold 20 so that the heat capacity of the second mold 30 may be lower than that of the first mold 20. In particular, a portion of the second mold 30 where the cavity 12 is formed is relatively thinner in order to lower the heat capacity. To relatively lower the heat capacity of the second mold 30 compared to that of the first mold 40, a recess portion 31 is formed in a portion of the second mold 30 corresponding to the cavity 12 so that the thickness between a bottom surface of the recess portion 31 and the cavity may be thin. The cavity 12 formed in the first and second molds 20 and 30 may have a variety of shapes according to the shape of a product to be formed.

The second mold 30 and the third mold 40 are assembled to and disassembled from each other by a hydraulic cylinder 16 installed at the first mold 20 or the second fixed plate 13 supporting the third mold 40. The second mold 30 may be installed so as to be movable by means of an actuator such as a hydraulic cylinder separately installed in the injection molding apparatus.

Uneven portions may be formed on the upper surface of the second mold 30 where the cavity 12 is formed and the lower surface of the third mold 40 to increase a surface area between the second and third molds 30 and 40 so that heat transfer between the second and third molds 30 and 40 may be smoothly performed. To this end, a plurality of coupling protrusions 41 coupled to the recess portion 31 formed on the upper surface of the second mold 30 may be formed on the lower surface of the third mold 40. A contact portion of an end portion of each of the coupling protrusions 41 that are coupled to the recess portion 31 may be installed at a position as close to the cavity 12 as possible. The third mold 40 may be configured to be inserted in the recess portion 31 formed in the second mold 30 by being supported on the second fixed plate 13.

A heat transfer member 17 is provided to enable smooth heat transfer between the second and third molds 30 and 40. The heat transfer member 17 may be formed of a copper (Cu) alloy exhibiting a relatively high coefficient of heat transfer.

The heating and cooling portion 60 heats the second mold 30 for forming a product and cools the second mold 30 while resin is cured after the forming is completed. As illustrated in FIGS. 1-4, the heating and cooling portion 60 includes a heating unit 61 to heat the second mold 30 during the injection of resin into the cavity 12 for forming a product and a cooling unit 65 to cool the second mold 30 during the curing of the resin injected into the cavity 12.

A plurality of grooves 62 used to install a heater are formed in the first mold 20, as illustrated in FIGS. 2 and 3. An electric heater 63 is installed in each of the grooves 62. The heating unit 61 is not limited to the above-described embodiment. A high frequency heater capable of heating the second mold 30 may be used as the heating unit 61.

The cooling unit 65, as illustrated in FIG. 4, includes a reservoir tank 67, a supply pipe 68, an auxiliary tank 77 and a return pipe 72. The reservoir tank 67 contains a heat transfer fluid and has an evaporator 66a of a cooling system 66 installed therein to cool a heat exchanger. The supply pipe 68 connects the reservoir tank 67 and a cooling path 42 formed in the third mold 40. The auxiliary tank 77 is connected to an output of the cooling path 42 via a connection pipe 69 and has an auxiliary evaporator 66b installed therein. The return pipe 72 connects the auxiliary tank 77 and the reservoir tank 67. A pump 73 to pump a cooled heat exchange fluid toward the cooling path 42 is installed at the supply pipe 68.

In another embodiment of the heating and cooling portion 60, while a cooling unit 80 is installed at the second mold 30, the heating unit 61 is installed at the third mold 40.

Since the cooling unit 80 is installed at the second mold 30 that is relatively thin, a cooling line is difficult to be independently formed by forming a hole in the second mold 30.

In the light of the foregoing disadvantage, as illustrated in FIG. 5, a tube installation groove 81 that is relatively wide and flat is formed on the rear surface of the second mold 30 corresponding to a portion where the cavity 12 is formed, and a cooling tube 82 for cooling of the second mold 30 is installed in the tube installation groove 81. A rectangular pipe may be used as the cooling tube 82 of the cooling unit 80 in order to lower a coupling height. The cooling tube 82 may be welded to the tube installation groove 81. A dimple may be formed inside the cooling tube 82 having a rectangular section in order to improve a heat exchange force. An inlet of the cooling tube 82 is connected to a reservoir tank 84 in which an evaporator 83a of a cooling system 83 via a supply pipe 85, an output of the cooling tube 82 is connected to an auxiliary tank 87 via a connection pipe 86. The auxiliary tank 87 and the reservoir tank 84 are connected to each other by a return pipe (72 of FIG. 4). A pump 88 to pump a cooled heat exchange fluid toward the cooling tube 82 is installed on the supply pipe 85.

Another embodiment of the cooling unit 80 for cooling the second mold 30 is shown in FIG. 6.

Referring to FIG. 6, a cooling unit 90 cools the second mold 30 using liquefied nitrogen gas or liquefied carbon gas. The cooling unit 90 includes a plurality of ejection nozzles 91 installed at the third mold 40 and a gas tank 93 filled with liquefied nitrogen gas or liquefied carbon gas and connected to the ejection nozzles 91 via a gas supply pipe 92. During the cooling of the second mold 30, by increasing the interval between the second and third molds 30 and 40, a liquid-phase gas is ejected from the ejection nozzles 91 so as to be evaporated on the surface of the second mold 30. To this end, a plurality of orifices (not shown) may be formed on the ejection nozzles 91.

In a heating unit (not shown) to heat the third mold 40, as in the above-described embodiment, a groove for installing a heater is formed in the third mold 40 and an electric heater is installed in the groove.

In FIG. 6, a heat unit 100 according to another embodiment of the present invention includes a reservoir tank 101 containing a heat exchange fluid, a heat exchange fluid supply pipe 102 connected to a heating path 43 formed in the third mold 40, and a heat exchange fluid collection pipe 103 connecting an outlet of the heating path 43 and the reservoir tank 101. A pump 104 to pump a heated heat exchange fluid toward the heating path 43 is installed on the heat exchange fluid supply pipe 102. An auxiliary reservoir tank 105 to contain collected heat exchange fluid is installed on the heat exchange fluid collection pipe 103. Heaters 107 and 108 to heat the heat exchange fluid are respectively installed at the reservoir tank 101 and the auxiliary reservoir tank 105.

The heating and cooling portion 90 of the injection molding apparatus according to the present invention may be implemented to directly heat or cool the second mold 30. That is, the second mold 30 may be heated and cooled by installing a heating unit at the second mold 30, as illustrated in FIG. 2, and the cooling tube on the rear surface of the second mold 30 as described above thereby supplying the heat exchange fluid for cooling.

FIG. 7 illustrates still another embodiment of a heating and cooling portion of the injection molding apparatus according to the present invention. In the following description, like reference numerals in the above-described embodiment denote like constituent elements.

Referring to FIG. 7, the injection molding apparatus includes a first mold 20 supported on a first fixed plate 11, a second mold 30 assembled to the first mold 20 to form a cavity 12 therebetween and having a guide portion 121, a third mold 122 installed so as to elevate along the guide portion 121 formed on the second mold 30 and assembled to and disassembled from the second mold 30, and a heating and cooling portion 130 installed at the third mold 122 to heat the third mold 122 during injection of resin into the cavity 12 for forming of a product and to cool the third mold 122 during curing of the resin injected into the cavity 12, thereby cooling the second mold 30. The third mold 122 moves up and down together with a cylinder 123 installed at a second fixed plate 13 in a process of injection.

The heating and cooling portion 130 consists of a heating unit 131 and a cooling unit 135. The heating unit 131 may be configured by installing an electric heater (not shown) at the third mold 122. The cooling unit 135 may cool the third mold 122 by supplying a cooled heat exchange fluid to a cooling path 136 formed in the third mold 122. Since the structure of the cooling unit 135 is substantially the same as that of the cooling system 66 of FIG. 4, a repeated description thereabout will be omitted herein.

FIG. 8 illustrates an injection molding apparatus according to still another embodiment of the present invention.

Referring to FIG. 8, the injection molding apparatus includes a first mold 20 supported on a first fixed plate 11, a second mold 30 assembled to the first mold 20 to form a cavity 12 therebetween and having a guide portion 121, and a third mold 40 installed so as to elevate with respect to the second mold 30 and assembled to and disassembled from the second mold 30. The injection molding apparatus further includes a heating and cooling portion 140 to heat or cool the second mold 30 during injection molding of a product.

The heating and cooling portion 140 includes a cooling unit 141 and a heating unit 145. The cooling unit 141 includes a pumping portion 142 that is formed by the second and third molds 30 and 40 at a side corresponding to the cavity 12 formed by the first and second molds 20 and 30 to absorb and eject a heat exchange fluid for heating and cooling. The pumping portion 142 includes a cylinder portion 142*a* formed on a rear surface of the second mold 30, that is, a rear surface corresponding to a portion where the cavity 12 is formed, and a piston portion 142*b* that is formed on the third mold 40 by being coupled to the cylinder portion 142*a* to absorb and eject the heat exchange fluid for heating and cooling during elevation of the third mold 40. A supply port 142*c* and an exhaust port 142*d* connected to the cylinder portion 142*a* are formed on the second mold 30. The support port 142*c* is connected to a reservoir tank 67 containing the heat exchange fluid, in which the evaporator 66*a* of the cooling system 66 for cooling of the heat exchanger is installed via the supply pipe 68. The exhaust port 142*d* is connected to an outlet of the reservoir tank 67 by the connection pipe 69. An auxiliary tank 71 is installed on the connection pipe 69. A pump 73 to pump a cooled heat exchange fluid toward the cooling path 42 is installed on the supply pipe 68. A check valve 143 to guide flow of the heat exchange fluid in a direction is installed at each side of the supply pipe 68 connected to the supply port 142*a* and the connection pipe 69 connected to the exhaust port 142*c*. A cylinder 144 is installed at the third mold 40 for the purpose of elevating the third mold 40, aside from assembling and disassembling of the first and second molds 20 and 30. The cylinder 144 may be installed such that its main body is mounted on the second fixed plate 13 and a rod is installed at the third mold 40. The heating unit 145 may be implemented by an electric heater installed at the third mold 40.

In the operation of the injection molding apparatus according to the present invention configured as above, first, when the temperature of the second mold 30 for injection is increased, the electric heater 63 installed at the groove 62 is driven. In this state, the first and second molds 20 and 30 are assembled to each other and resin for forming a product is injected into the cavity 12 to form the product.

In the process of forming a product, the third mold 40 is cooled by using the cooling system 66 installed at the third mold 40. That is, the heat exchange fluid contained in the reservoir tank 67 and cooled by the evaporator 66*a* of the cooling system 66 is supplied to the cooling path 42 formed in the third mold 40 via the supply pipe 68 to cool the third mold 40. The heat exchange fluid after heat exchange is completed is first stored in the auxiliary tank 69 and then collected into the reservoir tank 67.

When the forming of a product is completed by injecting resin into the cavity 12, electric power supplied to the electric heater 63 installed at the second mold 30 is interrupted and the third mold 40 is elevated to be assembled to the second mold 30. Then, the previously cooled air of the third mold 40 is transferred to the second mold 30, thereby rapidly cooling the second mold 30.

When the cooling is completed, the first and second molds 20 and 30 are disassembled from each other. Upon disassembling the first and second molds 20 and 30 from each other, a product is drawn out using the electric heater 63 and heating is continued while the assembling and drawing-out processes are being carried out.

When the electric heater is installed at the third mold 40 and the cooling unit 80 is installed at the second mold 30 as illustrated in FIG. 5, to heat the second mold 30, the second and third molds 30 and 40 are assembled to each other and the second mold 30 is heated by using the third mold 40 heated by the electric heater. To cool the second mold 30, the second and third molds 30 and 40 are disassembled from each other. The heat exchange fluid cooled by the cooling system 83 is supplied to the cooling tube 82 to cool the second mold 30.

When the cooling unit 90 and the heating unit 100 are installed at the third mold 40 as illustrated in FIG. 6, the heat exchange fluid heated by the heating unit 100 is supplied to the heating path 43 of the second mold 30 for injection molding to thus heat the second mold 30. When the injection molding is completed and the second mold 30 is cooled, the third mold 40 is disassembled from the second mold 30. Then, a liquid-phase gas contained in the gas tank 93 is ejected toward the rear surface of the second mold 30 so that the gas may be evaporated on the surface of the second mold 30. As a result, as the gas is evaporated on the surface of the second mold 30, heat is collected so that the second mold 30 may be cooled.

Also, as illustrated in FIG. 8, when the heating and cooling unit 140 include the electric heater installed at the second mold 30 and the pumping portion 142 formed by the second and third molds 30 and 40, the heat exchange medium for cooling is supplied and exhausted between the second and third molds 30 and 40 by the pumping portion 140 by means of the assembly and disassembly of the second and third molds 30 and 40 so that the second mold 30 may be cooled. In this case, the supply of electric power to the electric heater installed at the second mold 30 is cut off.

As described above, in the injection molding apparatus according to the present invention, fluidity of polymer resin in an injection mold is improved so that no weld line may be generated. Also, surface glossiness of a formed product is very superior so that a high quality product may be obtained. In addition, since a formed product is cooled not outside the mold, but inside the mold, after forming is complete, deformation that may be generated after the forming may be prevented.

INDUSTRIAL APPLICABILITY

The injection molding apparatus according to the present invention may be applied to a transfer forming method, a compression forming method, a reaction forming method, a blow forming method, and a thermal forming method, as well as the weldless forming method. In addition, the injection molding apparatus according to the present invention may be applied to an injection compression method, a local heating-pressing method, a gas press method, a gas assist method, a hollow forming method, a sandwich forming method, a two-color forming method, an in-mold forming method, a push-pull forming method, and a high speed forming method, as well as conventional forming methods.

While the present invention has been particularly shown and described with reference to preferred embodiments thereof, it will be understood by those of ordinary skill in the art that various changes in form and details may be made therein without departing from the spirit and scope of the present invention as defined by the following claims.

What is claimed is:

1. An injection molding apparatus for high-gloss products comprising:
   a first mold supported on a first fixed plate;
   a second mold assembled to the first mold to form a cavity and having a guide portion;
   a third mold installed so as to move up and down with respect to the second mold and assembled to and disassembled from the first and second molds; and a heating and cooling portion heating or cooling the second mold during injection molding of a product using the first and second molds,
wherein the heating and cooling portion comprises a cooling unit and a heating unit, the cooling unit formed by the second and third molds at a side corresponding to the cavity formed by the first and second molds to absorb and exhaust a heat exchange fluid for cooling, and the cooling unit comprising a pumping portion including a cylinder portion formed on a rear surface of the second mold and a piston portion installed at the third mold and coupled to the cylinder portion, and a reservoir tank connected to the cylinder portion by a supply pipe and exhaust pipe and supplying and exhausting the heat exchange fluid to and from the cylinder portion.

* * * * *